(12) United States Patent
Mergener

(10) Patent No.: US 11,674,642 B2
(45) Date of Patent: Jun. 13, 2023

(54) POWER TOOL HAVING OBJECT DETECTION

(71) Applicant: MILWAUKEE ELECTRIC TOOL CORPORATION, Brookfield, WI (US)

(72) Inventor: Matthew J. Mergener, Mequon, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 17/370,192

(22) Filed: Jul. 8, 2021

(65) Prior Publication Data
US 2021/0332946 A1    Oct. 28, 2021

Related U.S. Application Data

(62) Division of application No. 16/115,087, filed on Aug. 28, 2018, now Pat. No. 11,085,582.
(Continued)

(51) Int. Cl.
*F16P 3/14* (2006.01)
*B23Q 11/00* (2006.01)
(Continued)

(52) U.S. Cl.
CPC .......... *F16P 3/148* (2013.01); *B23Q 11/0082* (2013.01); *B23Q 11/0092* (2013.01);
(Continued)

(58) Field of Classification Search
CPC .. F16P 3/148; F16P 3/141; F16P 3/142; F16P 3/147; B23Q 11/0082; B23Q 11/0092; B23Q 17/2438; B25F 5/00
See application file for complete search history.

(56) References Cited

U.S. PATENT DOCUMENTS 6,080,041 A    6/2000   Greenland
6,536,536 B1   3/2003   Gass et al.
(Continued)

FOREIGN PATENT DOCUMENTS

CN   102187176 A   9/2011
CN   102574281 A   7/2012
(Continued)

OTHER PUBLICATIONS

International Search Report and Written Opinion for Application No. PCT/US2018/048344 dated Dec. 26, 2018 (23 pages).
(Continued)

*Primary Examiner* — Omar Flores Sanchez
(74) *Attorney, Agent, or Firm* — Michael Best & Friedrich LLP

(57) ABSTRACT

A power tool and methods are provided for detecting objects (e.g., flesh or other materials) in the operating path of a power tool's output component (e.g., saw blade or drill bit). An object detection sensor in the power tool generates an output signal indicative of a type of material detected in the operating path of the power tool. A power tool controller receives the object detection sensor output and determines when a material in the operating path of the power tool changes. The controller changes operation of a motor of the power tool (e.g., increasing or decreasing speed or stopping the motor) in response to the detected material change. The object detection sensor may include, for example, an RF sensor, a capacitive sensor, a camera, a conductivity probe, or an ultrasound probe.

19 Claims, 5 Drawing Sheets

Related U.S. Application Data

(60) Provisional application No. 62/552,105, filed on Aug. 30, 2017.

(51) Int. Cl.
 *B25F 5/00* (2006.01)
 *B23Q 17/24* (2006.01)

(52) U.S. Cl.
 CPC ............... *B25F 5/00* (2013.01); *F16P 3/141* (2013.01); *F16P 3/142* (2013.01); *F16P 3/147* (2013.01); *B23Q 17/2438* (2013.01)

(56) References Cited

U.S. PATENT DOCUMENTS

| | | |
|---|---|---|
| 6,813,983 B2 | 11/2004 | Gass et al. |
| 6,826,988 B2 | 12/2004 | Gass et al. |
| 6,834,730 B2 | 12/2004 | Gass et al. |
| 6,857,345 B2 | 2/2005 | Gass et al. |
| 6,880,440 B2 | 4/2005 | Gass et al. |
| 6,920,814 B2 | 7/2005 | Gass et al. |
| 6,922,153 B2 | 7/2005 | Pierga et al. |
| 6,945,148 B2 | 9/2005 | Gass et al. |
| 6,945,149 B2 | 9/2005 | Gass et al. |
| 6,957,601 B2 | 10/2005 | Gass et al. |
| 6,994,004 B2 | 2/2006 | Gass et al. |
| 6,997,090 B2 | 2/2006 | Gass et al. |
| 7,000,514 B2 | 2/2006 | Gass et al. |
| 7,024,975 B2 | 4/2006 | Gass et al. |
| 7,055,417 B1 | 6/2006 | Gass |
| 7,077,039 B2 | 7/2006 | Gass et al. |
| 7,093,668 B2 | 8/2006 | Gass et al. |
| 7,098,800 B2 | 8/2006 | Gass |
| 7,100,483 B2 | 9/2006 | Gass et al. |
| 7,121,358 B2 | 10/2006 | Gass et al. |
| 7,137,326 B2 | 11/2006 | Gass et al. |
| 7,171,879 B2 | 2/2007 | Gass et al. |
| 7,197,969 B2 | 4/2007 | Gass et al. |
| 7,210,383 B2 | 5/2007 | Gass et al. |
| 7,225,712 B2 | 6/2007 | Gass et al. |
| 7,228,772 B2 | 6/2007 | Gass |
| 7,231,856 B2 | 6/2007 | Gass et al. |
| 7,284,467 B2 | 10/2007 | Gass et al. |
| 7,290,472 B2 | 11/2007 | Gass et al. |
| 7,308,843 B2 | 12/2007 | Gass et al. |
| 7,328,752 B2 | 2/2008 | Gass et al. |
| 7,347,131 B2 | 3/2008 | Gass |
| 7,350,444 B2 | 4/2008 | Gass et al. |
| 7,350,445 B2 | 4/2008 | Gass et al. |
| 7,353,737 B2 | 4/2008 | Gass et al. |
| 7,357,056 B2 | 4/2008 | Gass et al. |
| 7,359,174 B2 | 4/2008 | Gass |
| 7,377,199 B2 | 5/2008 | Gass et al. |
| 7,421,315 B2 | 9/2008 | Gass et al. |
| 7,421,932 B1 | 9/2008 | Heinzmann et al. |
| 7,472,634 B2 | 1/2009 | Gass et al. |
| 7,481,140 B2 | 1/2009 | Gass et al. |
| 7,509,899 B2 | 3/2009 | Gass et al. |
| 7,525,055 B2 | 4/2009 | Gass et al. |
| 7,536,238 B2 | 5/2009 | Gass |
| 7,540,334 B2 | 6/2009 | Gass et al. |
| 7,591,210 B2 | 9/2009 | Gass et al. |
| 7,600,455 B2 | 10/2009 | Gass et al. |
| 7,610,836 B2 | 11/2009 | Gass et al. |
| 7,621,205 B2 | 11/2009 | Gass |
| 7,628,101 B1 | 12/2009 | Knapp et al. |
| 7,640,835 B2 | 1/2010 | Gass |
| 7,640,837 B2 | 1/2010 | Gass et al. |
| 7,644,645 B2 | 1/2010 | Gass et al. |
| 7,647,752 B2 | 1/2010 | Magnell |
| 7,661,343 B2 | 2/2010 | Gass et al. |
| 7,681,479 B2 | 3/2010 | Gass et al. |
| 7,685,912 B2 | 3/2010 | Gass et al. |
| 7,698,976 B2 | 4/2010 | Gass |
| 7,707,918 B2 | 5/2010 | Gass et al. |
| 7,707,920 B2 | 5/2010 | Gass et al. |
| 7,712,403 B2 | 5/2010 | Gass et al. |
| 7,739,934 B2 | 6/2010 | Tetelbaum et al. |
| 7,784,507 B2 | 8/2010 | Gass et al. |
| 7,788,999 B2 | 9/2010 | Gass et al. |
| 7,789,002 B2 | 9/2010 | Gass et al. |
| 7,804,204 B1 | 9/2010 | Shafer et al. |
| 7,827,889 B2 | 11/2010 | Carrier |
| 7,827,890 B2 | 11/2010 | Gass et al. |
| 7,827,893 B2 | 11/2010 | Gass et al. |
| 7,832,314 B2 | 11/2010 | Gass |
| 7,836,804 B2 | 11/2010 | Gass |
| 7,845,258 B2 | 12/2010 | Gass et al. |
| 7,866,239 B2 | 1/2011 | Gass et al. |
| 7,888,826 B1 | 2/2011 | Shafer et al. |
| 7,895,927 B2 | 3/2011 | Gass |
| 7,900,541 B2 | 3/2011 | Gass et al. |
| 7,908,950 B2 | 3/2011 | Gass et al. |
| 7,921,754 B2 | 4/2011 | Gass et al. |
| 7,958,806 B2 | 6/2011 | Gass et al. |
| 7,971,613 B2 | 7/2011 | Gass et al. |
| 7,991,503 B2 | 8/2011 | Gass |
| 7,997,176 B2 | 8/2011 | Gass et al. |
| 8,006,595 B2 | 8/2011 | Gass |
| 8,011,279 B2 | 9/2011 | Gass et al. |
| 8,051,759 B2 | 11/2011 | Gass et al. |
| 8,061,245 B2 | 11/2011 | Gass |
| 8,061,246 B2 | 11/2011 | Gass et al. |
| 8,065,943 B2 | 11/2011 | Gass et al. |
| 8,074,546 B1 | 12/2011 | Knapp et al. |
| 8,079,292 B2 | 12/2011 | Gass et al. |
| 8,079,295 B2 | 12/2011 | Gass |
| 8,087,438 B2 | 1/2012 | Gass |
| 8,100,039 B2 | 1/2012 | Gass |
| 8,122,798 B1 | 2/2012 | Shafer et al. |
| 8,122,807 B2 | 2/2012 | Gass et al. |
| 8,151,675 B2 | 4/2012 | Gass et al. |
| 8,186,253 B2 | 5/2012 | Tetelbaum et al. |
| 8,186,255 B2 | 5/2012 | Gass et al. |
| 8,191,450 B2 | 6/2012 | Gass |
| 8,196,499 B2 | 6/2012 | Gass |
| 8,246,059 B2 | 8/2012 | Gass et al. |
| 8,266,997 B2 | 9/2012 | Gass et al. |
| 8,291,797 B2 | 10/2012 | Gass et al. |
| 8,371,196 B2 | 2/2013 | Gass et al. |
| 8,386,067 B2 | 2/2013 | Krapf |
| 8,402,869 B2 | 3/2013 | Gass et al. |
| 8,408,106 B2 | 4/2013 | Gass |
| 8,413,559 B2 | 4/2013 | Gass |
| 8,424,429 B1 | 4/2013 | Knapp et al. |
| 8,430,005 B2 | 4/2013 | Gass et al. |
| 8,438,958 B2 | 4/2013 | Gass et al. |
| 8,459,157 B2 | 6/2013 | Gass et al. |
| 8,469,067 B2 | 6/2013 | Gass et al. |
| 8,489,223 B2 | 7/2013 | Gass |
| 8,490,527 B2 | 7/2013 | Gass et al. |
| 8,498,732 B2 | 7/2013 | Gass |
| 8,505,424 B2 | 8/2013 | Gass et al. |
| 8,511,693 B2 | 8/2013 | Gass et al. |
| 8,522,655 B2 | 9/2013 | Gass et al. |
| 8,534,174 B2 | 9/2013 | Kajita et al. |
| 8,640,583 B2 | 2/2014 | Pierga et al. |
| 8,646,369 B2 | 2/2014 | Gass et al. |
| 8,919,231 B2 | 12/2014 | Butler et al. |
| 8,950,305 B1 | 2/2015 | Shiban |
| 9,038,515 B2 | 5/2015 | Gass |
| 9,522,476 B2 | 12/2016 | Gass |
| 9,555,491 B2 | 1/2017 | Gass et al. |
| 9,623,498 B2 | 4/2017 | Gass et al. |
| 9,702,504 B2 | 7/2017 | Pierga et al. |
| 9,724,840 B2 | 8/2017 | Gass |
| 9,757,871 B2 | 9/2017 | Burke et al. |
| 9,844,891 B2 | 12/2017 | Gass et al. |
| 9,877,410 B2 | 1/2018 | Feraki et al. |
| 9,878,380 B2 | 1/2018 | Gass et al. |
| 9,908,189 B2 | 3/2018 | Gass et al. |
| 9,919,369 B2 | 3/2018 | Gass et al. |
| 9,925,683 B2 | 3/2018 | Gass et al. |
| 9,927,796 B2 | 3/2018 | Gass |

(56) References Cited

U.S. PATENT DOCUMENTS

| | | |
|---|---|---|
| 9,937,573 B2 | 4/2018 | Haldar |
| 9,962,778 B2 | 5/2018 | Talesky et al. |
| 9,969,014 B2 | 5/2018 | Gass |
| 9,981,326 B2 | 5/2018 | Gass et al. |
| 2002/0017179 A1 | 2/2002 | Gass et al. |
| 2002/0066346 A1 | 6/2002 | Gass et al. |
| 2003/0015253 A1 | 1/2003 | Gass et al. |
| 2003/0019341 A1 | 1/2003 | Gass et al. |
| 2003/0037651 A1 | 2/2003 | Gass et al. |
| 2003/0056853 A1 | 3/2003 | Gass et al. |
| 2003/0131703 A1 | 7/2003 | Gass et al. |
| 2003/0140749 A1 | 7/2003 | Gass et al. |
| 2004/0040426 A1 | 3/2004 | Gass et al. |
| 2004/0265079 A1 | 12/2004 | Dils et al. |
| 2005/0041359 A1 | 2/2005 | Gass |
| 2005/0139056 A1 | 6/2005 | Gass et al. |
| 2005/0139459 A1 | 6/2005 | Gass et al. |
| 2006/0123960 A1 | 6/2006 | Gass et al. |
| 2006/0123964 A1 | 6/2006 | Gass et al. |
| 2006/0197020 A1 | 9/2006 | Trzecieski |
| 2006/0219076 A1 | 10/2006 | Gass et al. |
| 2006/0225551 A1 | 10/2006 | Gass et al. |
| 2007/0028733 A1 | 2/2007 | Gass |
| 2007/0157784 A1 | 7/2007 | Gass et al. |
| 2008/0110653 A1 | 5/2008 | Zhang et al. |
| 2008/0178722 A1 | 7/2008 | Gass et al. |
| 2008/0295660 A1 | 12/2008 | Gass et al. |
| 2009/0114070 A1 | 5/2009 | Gass |
| 2009/0174162 A1 | 7/2009 | Gass et al. |
| 2009/0178524 A1 | 7/2009 | Gass et al. |
| 2010/0083804 A1 | 4/2010 | Gass et al. |
| 2010/0180741 A1 | 7/2010 | Gass et al. |
| 2010/0213018 A1 | 8/2010 | Gass et al. |
| 2011/0048197 A1 | 3/2011 | Winkler |
| 2011/0056351 A1 | 3/2011 | Gass et al. |
| 2011/0138978 A1 | 6/2011 | Gass et al. |
| 2011/0203438 A1 | 8/2011 | Nenadic et al. |
| 2012/0216665 A1 | 8/2012 | Gass et al. |
| 2014/0260852 A1 | 9/2014 | Laliberte |
| 2014/0290455 A1 | 10/2014 | Gass |
| 2014/0331833 A1 | 11/2014 | Gass et al. |
| 2014/0360819 A1 | 12/2014 | Gass et al. |
| 2015/0075342 A1 | 3/2015 | Butler et al. |
| 2015/0107427 A1 | 4/2015 | Gass et al. |
| 2015/0151371 A1 | 6/2015 | Gass et al. |
| 2015/0165641 A1 | 6/2015 | Gass et al. |
| 2015/0217421 A1 | 8/2015 | Gass |
| 2015/0273723 A1 | 10/2015 | Gass et al. |
| 2015/0273725 A1 | 10/2015 | Gass et al. |
| 2015/0283630 A1 | 10/2015 | Gass et al. |
| 2015/0321271 A1 | 11/2015 | Nenadic et al. |
| 2015/0321365 A1 | 11/2015 | Lauritsen |
| 2016/0046034 A1 | 2/2016 | Burke et al. |
| 2016/0082529 A1 | 3/2016 | Gass et al. |
| 2016/0158959 A9 | 6/2016 | Gass et al. |
| 2016/0263769 A1 | 9/2016 | Laliberte et al. |
| 2016/0318142 A1 | 11/2016 | Maharshi Ramaswamy et al. |
| 2016/0319989 A1 | 11/2016 | Ramaswamy et al. |
| 2016/0346849 A1 | 12/2016 | Gass |
| 2017/0190012 A9 | 7/2017 | Gass |
| 2017/0190041 A1 | 7/2017 | Dey, IV et al. |
| 2017/0216986 A1 | 8/2017 | Dey, IV et al. |
| 2017/0312837 A1 | 11/2017 | Gass et al. |
| 2017/0334087 A1 | 11/2017 | Gass |
| 2017/0368710 A1 | 12/2017 | Burke et al. |

FOREIGN PATENT DOCUMENTS

| | | |
|---|---|---|
| CN | 103118844 B | 5/2015 |
| DE | 102007032221 A1 | 1/2009 |
| DE | 102008055062 A1 | 6/2010 |
| DE | 202008018113 U1 | 12/2011 |
| EP | 2331905 B1 | 5/2012 |
| EP | 2826604 A1 | 1/2015 |
| EP | 2621692 B1 | 7/2016 |
| WO | 2010027598 A1 | 3/2010 |
| WO | 2010059786 A1 | 5/2010 |
| WO | 2012/044377 A1 | 4/2012 |
| WO | 2014102811 A1 | 7/2014 |
| WO | 2015073405 A1 | 5/2015 |
| WO | 2015091245 A1 | 6/2015 |
| WO | 2017093877 A1 | 6/2017 |

OTHER PUBLICATIONS

Extended European Search Report for Application No. 18850890.7 dated Apr. 7, 2021 (9 pages).

Chinese Patent Office Action for Application No. 201880057191.1 dated Aug. 10, 2022 (23 pages including machine English Translation).

POWER TOOL HAVING OBJECT DETECTION

CROSS-REFERENCE TO RELATED APPLICATIONS

This application is a division of and claims priority to U.S. patent application Ser. No. 16/115,087, filed Aug. 28, 2018, which claims priority to U.S. Provisional Patent Application No. 62/552,105, filed Aug. 30, 2017, the entire contents of which are both hereby incorporated by reference.

FIELD OF THE INVENTION

The present invention relates to detecting objects during operation of power tools. More specifically, the present invention relates changing operation of a power tool based on detection of an object.

SUMMARY

In one embodiment, a power tool is provided including a housing, a motor within the housing, an output component coupled to the motor and defining an operating path of the power tool, an object detection sensor, and a controller. The operating path of the power tool is defined by the direction of motion of the output component when driven by the motor. The object detection sensor is configured to generate an output signal indicative of a material in the operating path of the power tool. The controller is coupled to the motor and the object detection sensor. The controller is configured to receive the output signal from the object detection sensor, and determine, based on the output signal, when the material in the operating path of the power tool changes. The controller is also configured to change an operation of the motor in response to determining that the material in the operating path of the power tool changed.

In another embodiment a method is provided for operating a power tool including a motor and an output component. The power tool defines an operating path of the power tool based on the direction of motion in which an output component of the power tool is driven by the motor. The method includes receiving, at a controller, an output signal from an object detection sensor of the power tool, and determining, by the controller, whether flesh is present in the operating path of the power tool. The method also includes interrupting power to the motor in response to determining that flesh is present in the operating path of the power tool.

In another embodiment a method is provided for operating a power tool including a motor and an output component. The power tool defines an operating path of the power tool based on the direction of motion in which an output component of the power tool is driven by the motor. The method includes receiving, at a controller, an output signal from an object detection sensor of the power tool, and determining, by the controller based on the output signal, that an object is present in the operating path of the power tool and that the object is of a certain type. The method also includes interrupting power to the motor in response to determining that the object that is present in the operating path of the power tool is of the certain type.

Other aspects will become apparent by consideration of the detailed description and accompanying drawings.

DETAILED DESCRIPTION

Figure 1:
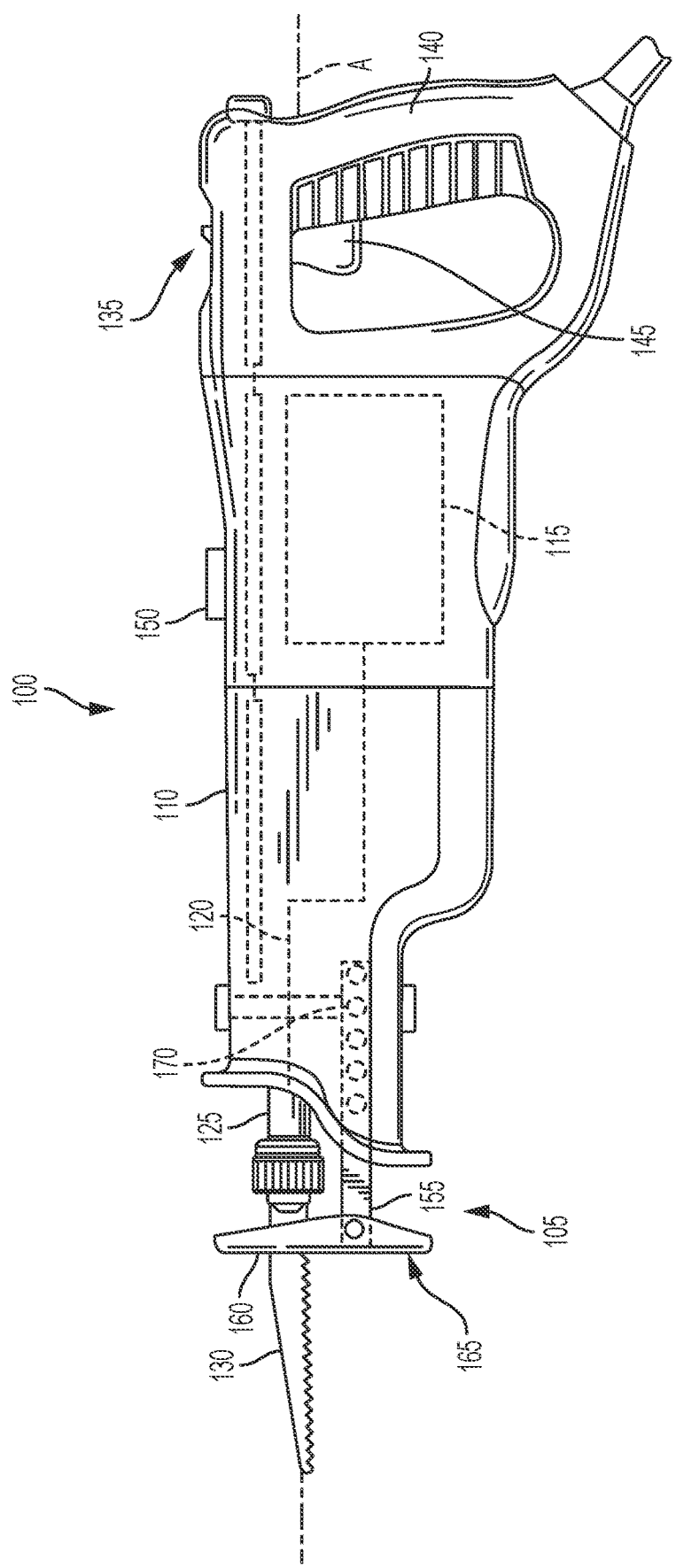
FIG. 1 illustrates an example power tool implementing embodiments disclosed herein.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

FIG. 1 illustrates an exemplary power tool 100. In the illustrated embodiment, the power tool 100 is a reciprocating saw. However, although FIG. 1 illustrates the power tool 100 as a reciprocating sabre saw, various embodiments described herein may be implemented on other types of reciprocating saws including, for example, jigsaws, scroll saws, and rotary reciprocating saws. Additionally, various embodiments described herein may be implemented on other power saws (for example, table saws, circular saw, and miter saws) and on other power tools that drive an external output component including, for example, drills/drivers, impact drivers, impact wrenches, rotary hammers, nail guns, staplers, and the like.

The power tool 100 defines a longitudinal axis A. The power tool 100 generally includes a shoe assembly 105, and a main body 110 having a motor 115. The motor 115 receives power from an electric cord (for example, in an AC version), a battery pack (for example, in a DC version), a source of compressed air (for example, in a pneumatic version), or a combination thereof. A drive mechanism 120 converts rotational motion of the motor 115 to reciprocating motion of a reciprocating spindle 125 to reciprocate a saw blade 130 (i.e., the output component) in a direction substantially parallel to the longitudinal axis A of the power tool 100. The power tool 100 also includes a handle assembly 135 positioned at a distal end of the main body 110 opposite the shoe assembly 105. The handle assembly 135 includes a grip portion 140 and a trigger 145 adjacent the grip portion 140 for actuating the motor 115. The trigger 145 is positioned such that a user can actuate the trigger 145 using the same hand that is holding the grip portion 140, for example, with an index finger. The power tool 100 further includes a mode pad 150. The mode pad 150 allows a user to select a mode of the power tool 100 and indicates to the user the currently selected mode of the power tool 100, which is described in greater detail below.

The shoe assembly 105 includes a shoe post 155 and a shoe 160. The shoe 160 is pivotally mounted on a distal end of the shoe post 155 away from the main body 110. In other constructions, the shoe 160 may be fixedly mounted to the shoe post 155, or mounted in other suitable ways. In other constructions, other types of shoe assemblies may be employed. The shoe assembly 105 is secured relative to the main body 110 of the power tool 100 and provides a guiding surface 165 for resting the power tool 100 against a workpiece (not shown) during cutting operations. The shoe assembly 105 includes the longitudinally-extending shoe post 155, extending substantially parallel to the longitudinal axis A of the power tool 100, which is at least partially disposed within an orifice of the main body 110 of the power tool 100. The shoe post 155 is axially movable relative to the main body 110 of the power tool 100 in a direction substantially parallel to the axis A and includes a locking mechanism 170 for stabilizing the shoe assembly 105 in one of a plurality of axial positions relative to the main body 110. For example, the locking mechanism 170 may include a ball detent system. In other constructions, other suitable types of locking mechanisms may be employed, such as magnets, cams, other types of detent mechanisms, etc.

Figure 2:
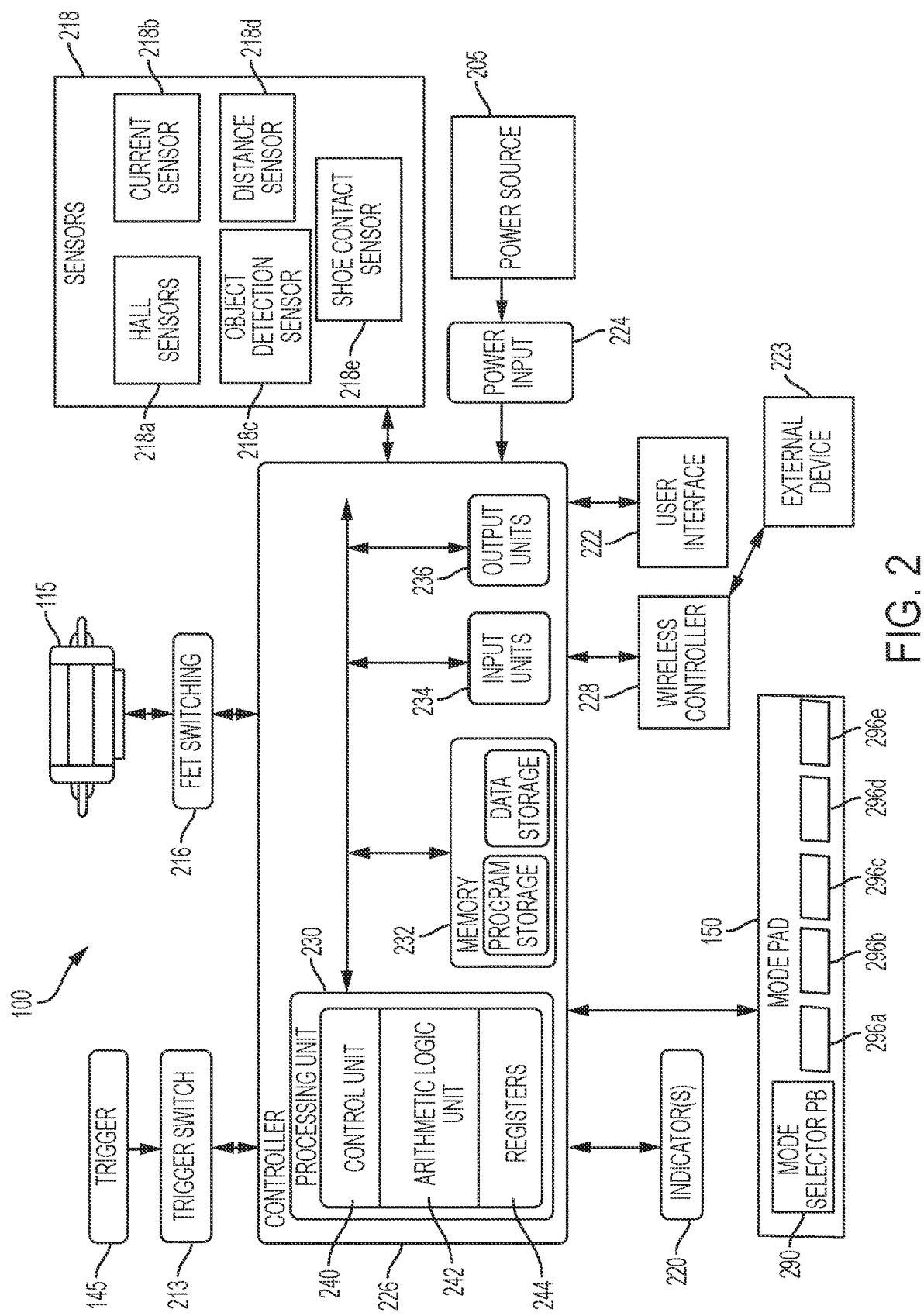
FIG. 2 is a schematic diagram of the power tool.

FIG. 2 illustrates a schematic diagram of the power tool 100 including the motor 115. The motor 115 actuates the drive mechanism 120 as explained previously herein. A primary power source 205 (e.g., a battery pack or AC supply) couples to the power tool 100 and provides electrical power to energize the motor 115. The motor 115 is energized based on the position of the trigger 145. When the trigger 145 is depressed, the motor 115 is energized, and when the trigger 145 is released, the motor 115 is de-energized. The trigger 145 moves in a first direction towards the handle assembly 135 when the trigger 145 is depressed by the user. The trigger 145 is biased (e.g., with a spring) such that it moves in a second direction away from the handle assembly 135, when the trigger 145 is released by the user. When the trigger 145 is depressed by the user, the push rod activates the trigger switch 213, and when the trigger 145 is released by the user, the trigger switch 213 is deactivated. An activation signal is output by the trigger switch 213, which may be analog or digital, that is indicative of the position of the trigger 145 (e.g., as being depressed, released, or a position between depressed and released).

As shown in FIG. 2, the power tool 100 also includes the power source 205, a switching network 216, sensors 218, indicators 220, a user interface 222, a power input unit 224, a controller 226, and a wireless communication controller 228. The power source 205 provides power to the power input unit 224. The power input unit 224 includes active and/or passive components (e.g., voltage step-down controllers, voltage converters, rectifiers, filters, etc.) to regulate or control the power received from the power source 205 and by the controller 226.

Figure 5B:
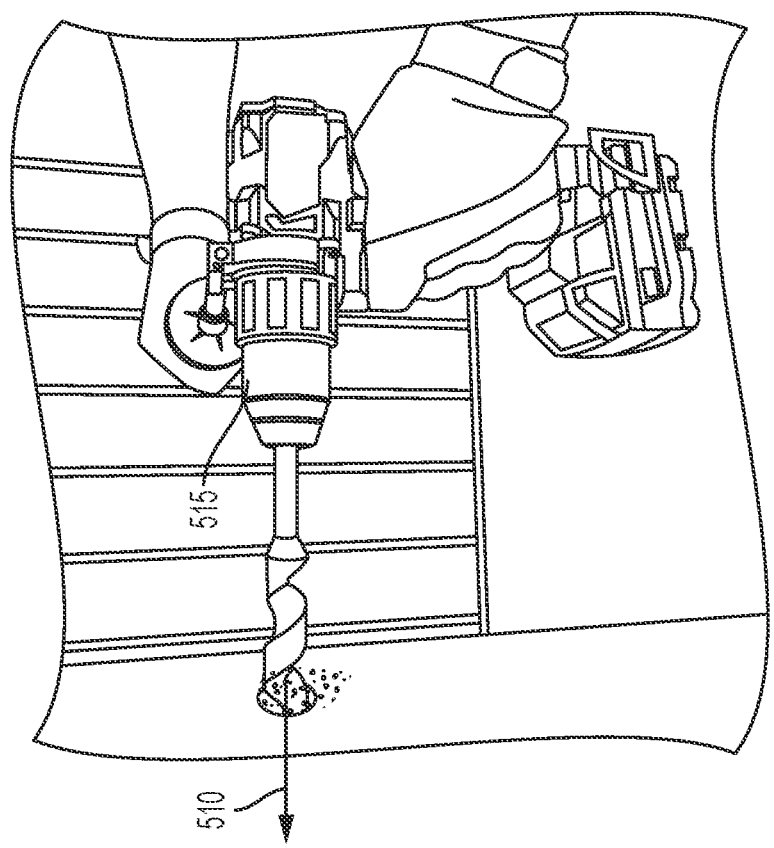
FIGS. 5A-5B illustrate further example power tools implementing to embodiments disclosed herein.
Figure 5A:
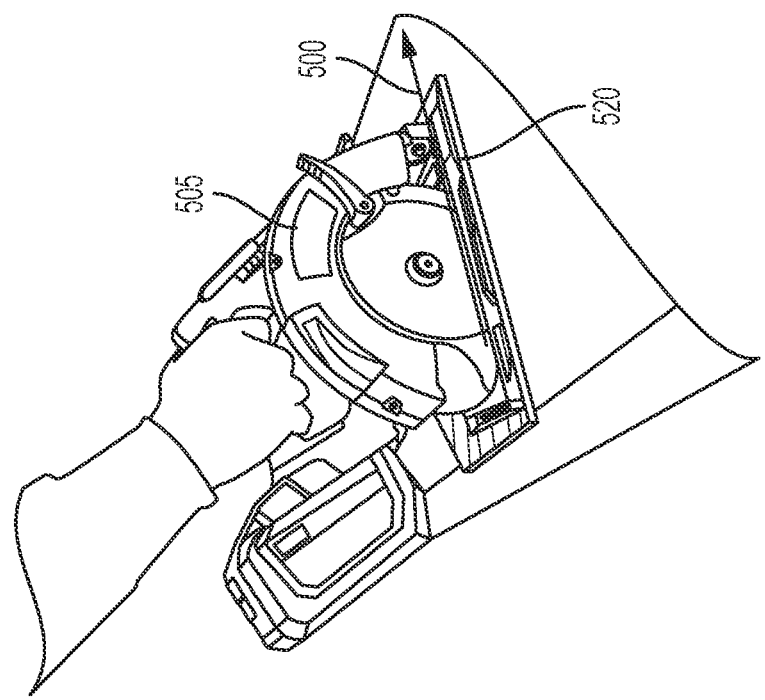

In some embodiments, the power tool 100 includes a battery pack interface, such as illustrated in FIGS. 5A-B. In such embodiments, the battery pack interface is coupled to the controller 226 and couples to a battery pack. The battery pack interface includes a combination of mechanical and electrical components configured to and operable for interfacing (e.g., mechanically, electrically, and communicatively connecting) the power tool 100 with the battery pack. The battery pack interface is coupled to the power input unit 224. The battery pack interface transmits the power received from the battery pack to the power input unit 224.

The switching network 216 enables the controller 226 to control the operation of the motor 115. Generally, when the trigger 145 is depressed as indicated by an output of the trigger switch 213, electrical current is supplied from the power source 205 to the motor 115, via the switching network 216. When the trigger 145 is not depressed, electrical current is not supplied from the power source 205 to the motor 115.

In response to the controller 226 receiving the activation signal from the trigger switch 213 indicating at least partial depression of the trigger 145, the controller 226 activates the switching network 216 to provide power to the motor 115. The switching network 216 controls the amount of current available to the motor 115 and thereby controls the speed and torque output of the motor 115. The switching network 216 may include numerous FETs, bipolar transistors, or other types of electrical switches. For instance, the switching network 216 may include a six-FET bridge that receives pulse-width modulated (PWM) signals from the controller 226 to drive the motor 115.

The sensors 218 are coupled to the controller 226 and communicate to the controller 226 various signals indicative of different parameters of the power tool 100 or the motor 115. The sensors 218 may include Hall sensors 218a, one or more current sensors 218b, one or more object detection sensors 218c, one or more distance sensors 218d, one or more shoe contact sensors 218e, among other sensors, such as, for example, one or more voltage sensors, one or more temperature sensors, and one or more torque sensors. While these respective sensors are generally referred to in the singular herein (e.g., the distance sensor 218d), these sensors may include one sensor (e.g., one distance sensor 218d) or more than one sensor (e.g., two or more distances sensors 218d) in some embodiments. The controller 226 can monitor the current drawn by the motor 115 using the current sensor 218b. The distance sensor 218d may be an induction sensor that determines the distance between the material being cut and the shoe 160. Additionally, the shoe contact sensor 218e may be an induction sensor that determines whether material is contacting the shoe 160. As explained in further detail below, the object detection sensor 218c may include capacitive sensors, RF sensors, ultrasound sensors, visual sensors (e.g., cameras), conductivity sensors, noncontact voltage sensors, or a combination thereof. The object detection sensor(s) 218c generates an output indicative of whether a particular object is proximate the operating path of the power tool 100. The operating path of the power tool 100 is defined by the direction of travel of the output component of the power tool 100 when the power tool 100 is operated. In other words, the operating path refers to the area in which the output component (e.g., a blade, a drill bit, and the like) of the power tool 100 is being driven, or is expected to be driven in the current operation. As just two examples, FIG. 5A illustrates a first operating path 500 of a circular saw 505, and FIG. 5B illustrates a second operating path 510 of a drill-driver 515. The size of a given operating path may vary by tool and by embodiment. For example, in some embodiments, the first operating path 500 extends forward of the circular saw 505 (e.g., by 2-4 inches), while in other embodiments, the first operating path 500 ends at the front-most portion of plate 520. In some embodiments, the operating path, such as the first operating path 500, is defined in terms of a volume, such as the volume by which the output component extends out from the power tool. For example, in some embodiments, the first operating path 500 is defined as having a width equal to the blade width, a height equal to the amount the blade extends out from (below) the plate 520, and a length equal to the length from the rear-most portion of the blade to the front-most portion of blade extending out from the plate 520.

Each Hall sensor 218a outputs motor feedback information to the controller 226, such as an indication (e.g., a pulse) when a magnet of the motor's rotor rotates across the face of that Hall sensor. Based on the motor feedback information from the Hall sensors 218a, the controller 226 can determine the position, velocity, and acceleration of the rotor. In response to the motor feedback information and the signals from the trigger switch 213, the controller 226 transmits control signals to control the switching network 216 to drive the motor 115. For instance, by selectively enabling and disabling the FETs of the switching network 216, power received via the power source 205 is selectively applied to stator coils of the motor 115 to cause rotation of its rotor. The motor feedback information is used by the controller 226 to ensure proper timing of control signals to the switching network 216 and, in some instances, to provide closed-loop feedback to control the speed of the motor 115 to be at a desired level.

The object detection sensor(s) 218c indicate whether an extraneous object is present in the operating path of the power tool 100. An object may be present in the operating path when it is within or proximate to the operating path. The object detection sensor(s) 218c may be implemented, for example, to detect whether flesh (e.g., a finger, hand, arm, or other limb of a living being) is within the operating path of the power tool 100. In some embodiments, however, the object detection sensor 218c may also determine the type of object that is present the operating path of the power tool 100.

In one embodiment, the object detection sensor 218c includes a radio frequency (RF) sensor. The RF sensor transmits RF signals, and analyzes changes in the response signal (e.g., a received signal that is a reflection of or otherwise corresponds to the originally transmitted RF signal) to determine whether an extraneous object is present in the operating path of the power tool 100. When an object is in the travel path of the RF signal, a parameter of the signal changes and the corresponding received signal is different than the originally transmitted signal. As discussed in further detail below, the controller 226 receives information regarding the originally transmitted RF signal, the response signal, the difference(s) between the originally transmitted RF signal and the response signal, or a combination thereof, and determines based on the RF sensor whether an object is in the operating path of the power tool 100 and, in some embodiments, the type of object that is in the operating path of the power tool 100.

In another embodiment, the object detection sensor 218c includes a capacitive sensor. The capacitive sensor monitors the changes in a capacitive field in the operating path of the power tool 100 to determine whether an object is present in the operating path of the power tool 100 and, in some embodiments, to determine which type of object is present in the operating path of the power tool 100. In some embodiments, the capacitive sensor includes a single capacitive probe that forms a capacitor with a detected object. A voltage signal is applied to the capacitive probe, and the capacitance changes based on the object that forms the capacitor with the capacitive probe. Based on the distance between the capacitive probe and the detected object, the material properties of the detected object, the material between the capacitive probe and the detected object, or a combination thereof, the capacitance at the capacitive probe change. In other embodiments, the capacitive sensor includes two capacitive probes, for example, that are positioned opposite to each other. When an object enters the area between the two capacitive probes, the capacitance between the two probes changes. The capacitive sensor generates an output indicative of the capacitance sensed by the capacitive probe (or capacitive probes), and transmits the output to the controller 226 periodically. In other embodiments, the capacitive sensor generates an output indicative of the change in capacitance at the single capacitive probe or the pair of capacitive probes, and transmits the output to the controller 226.

In other embodiments, the object detection sensor 218c includes an ultrasound probe. Similar to the RF sensor, the ultrasound probe generates and transmits an ultrasound signal and analyzes the response signal (a reflection of or otherwise corresponding to the originally transmitted signal) to determine whether an object is present in the operating pathway of the power tool 100, and, in some embodiments, a type of object that is present in the operating pathway of the power tool 100. When an object is in the travel path of the ultrasound signal, a parameter of the signal changes and the corresponding response signal differs from the originally transmitted ultrasound signal. As discussed in further detail below, the controller 226 receives from the ultrasound sensor information regarding the originally transmitted ultrasound signal, the response signal, the difference(s) between the originally transmitted ultrasound signal and the response signal, or a combination thereof, and determines based on the received information whether an object is in the operating path of the power tool 100 and, in some embodiments, the type of object that is in the operating path of the power tool 100.

In yet other embodiments, the object detection sensor 218c includes a camera (or an array of cameras) mounted on the power tool 100. The camera visually monitors the operating path of the power tool 100 and outputs image data to the controller 226 to enable the controller 226 to determine whether an object is present in the operating pathway of the power tool 100 and, in some embodiments, the type of object that is present in the operating pathway of the power tool 100. In some embodiments, a single camera is mounted to the power tool 100. The camera captures image data including, for example, light patterns in the operating pathway of the power tool 100, surface textures in the operating pathway, and the like, which is used by the controller 226 to identify when an object (and the type of object) that is present in the operating pathway. In some embodiments, two or more cameras are mounted on the power tool 100. The cameras may be mounted such that depth information (e.g., depth perception) may be obtained by analyzing the image data from both cameras. The image data obtained by the camera (or camera array) may include visual information in grayscale, color, black and white, or other formats (e.g., HSV, LSL, and the like).

In further embodiments, the object detection sensor 218c includes a conductivity probe. In some embodiments, the conductivity probe may be coupled to the output component of the power tool 100 (e.g., the blade or drill bit). The conductivity probe generates an output indicative of the conductivity of the output component. When an object touches the output component, the conductivity of the output component changes, and such a change is registered by the conductivity probe. In other embodiments, two conductivity probes are used to measure the conductivity of the space or material in the operating path of the power tool 100. When an object enters the operating pathway of the power tool 100, the conductivity changes and such a change is registered by the conductivity probes.

The indicators 220 are also coupled to the controller 226 and receive control signals from the controller 226 to turn on and off or otherwise convey information based on different states of the power tool 100. The indicators 220 include, for example, one or more light-emitting diodes ("LED"), or a display screen. The indicators 220 can be configured to display conditions of, or information associated with, the power tool 100. For example, the indicators 220 are configured to indicate measured electrical characteristics of the power tool 100, the status of the power tool 100, the mode of the power tool (discussed below), etc. The indicators 220 may also include elements to convey information to a user through audible or tactile outputs.

As described above, the controller 226 is electrically and/or communicatively connected to a variety of modules or components of the power tool 100. In some embodiments, the controller 226 includes a plurality of electrical and electronic components that provide power, operational control, and protection to the components and modules within the controller 226 and/or power tool 100. For example, the controller 226 includes, among other things, a processing unit 230 (e.g., a microprocessor, a microcontroller, or another suitable programmable device), a memory 232, input units 234, and output units 236. The processing unit 230 (herein, electronic processor 230) includes, among other things, a control unit 240, an arithmetic logic unit ("ALU") 242, and a plurality of registers 244 (shown as a group of registers in FIG. 2). In some embodiments, the controller 226 is implemented partially or entirely on a semiconductor (e.g., a field-programmable gate array ["FPGA"] semiconductor) chip, such as a chip developed through a register transfer level ("RTL") design process. In other embodiments, the controller 226 is implemented as an Application Specific Integrated Circuit (ASIC).

The memory 232 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The electronic processor 230 is connected to the memory 232 and executes software instructions that are capable of being stored in a RAM of the memory 232 (e.g., during execution), a ROM of the memory 232 (e.g., on a generally permanent basis), or another non-transitory computer readable medium such as another memory or a disc. Software included in the implementation of the power tool 100 can be stored in the memory 232 of the controller 226. The software includes, for example, firmware, one or more applications, program data, filters, rules, one or more program modules, and other executable instructions. The electronic processor 230 is configured to retrieve from memory and execute, among other things, instructions related to the control processes and methods described herein. The electronic processor 230 is also configured to store power tool information on the memory 232 including operational data, information identifying the type of tool, a unique identifier for the particular tool, and other information relevant to operating or maintaining the power tool 100. The tool usage information, such as current levels, motor speed, motor acceleration, motor direction, may be captured or inferred from data output by the sensors 218.

The input units 234 and output units 236 enable the processing unit 230 to communicate with various components, such as the mode pad 150, the trigger switch 213, the switching network 216, the indicators 220, the wireless controller 228, and the user interface 222. For example, the input units 234 and the output unites 236 may include conductive pins, driver circuitry, buffers, or a combination thereof.

The power tool 100 operates in various modes. Each mode enables different features to be executed by the power tool 100 and facilitates certain applications for the user. The current operational mode of the power tool 100 is selected by the user for instance, using the mode pad 150. For example, with respect to FIG. 2, the mode pad 150 includes a mode selector push button 290 and mode indicators 296*a-e*. By depressing the mode selector push button 290, the electronic processor 230 cycles between modes of the power tool 100. The electronic processor 230 also controls the mode indicators 296*a-e* to illuminate in a certain manner to indicate the current mode.

The controller 226 receives the signal(s) from the object detection sensor 218*c* and determines, based on the output signals from the sensor 218*c*, whether an object is present in the operating pathway of the power tool 100, and, in some embodiments, a type of object that is present in the operating pathway. When the object detection sensor 218*c* includes the RF sensor, the controller 226 receives various measured parameters of the originally transmitted signal and the response signal, and determines based on the difference in parameters whether an object is in the operating path of the power tool 100. For example, since different materials reflect different frequencies better than others, in one embodiment, the RF sensor transmits a wideband frequency signal. The transmitted signal travels until it reaches a reflecting object or surface (for example, an object in the operating path of the power tool 100). The object then reflects a response signal back toward the RF sensor. The frequency of the response signal, however, depends on the material of the object from which the response signal reflects. For example, drywall may reflect back a first group of frequencies better than a second group of frequencies, while metal may reflect the second group of frequencies better than the first group of frequencies. Accordingly, when drywall is in the operating path of the power tool 100, the response signal will be primarily in the first group frequencies. However, when a metal pipe, for example, enters the operating path of the power tool 100, the response signal changes to include more frequencies from the second group of frequencies. Therefore, by determining a primary frequency (or group of frequencies) of the response signal, the controller may determine whether an object is present in the operating pathway of the power tool 100. Additionally, the controller may detect a change in the primary frequency (or group of frequencies) during operation of the power tool 100 and, in response, determine that a new object is present in the operating pathway of the power tool 100. Moreover, the controller 226 is also configured to determine a type of object that is in the operating pathway of the power tool 100 using predetermined frequency responses associated with a variety of object types. In other words, by comparing the frequency of the response signal to predetermined frequency responses for various materials (e.g., in a lookup table in the memory 232) and identifying a match or similar frequency response, the controller 226 determines the type of material present in the operating pathway of the power tool 100.

Based on the material determined by the controller 226, the controller 226 can, for example, interrupt the power to the motor 115. For example, when the controller 226 determines that a part of a living being is in the operating path of the power tool 100, the controller 226 interrupts power to the motor 115 to inhibit the power tool 100 from operating the output component is the same area as the detected part of the living being. In other embodiments, the controller 226 is programmed to avoid operating on certain materials, for example, metal pipes, water conduits, or electrical conduits, so as to avoid damaging other components of the construction. In such embodiments, the controller 226 may first determine whether the certain materials are present in the operating path of the power tool 100 and allows the motor 115 to be activated when the certain materials are determined to not be proximate to the operating path of the power tool 100.

In other embodiments, the controller 226 determines the phase angle of the originally transmitted RF signal and the corresponding response signal. Because different materials reflect RF signals differently, the phase angle of the response signal may be indicative of the type of material that reflected the originally transmitted RF signal. Accordingly, the controller 226 may calculate a phase difference between the originally transmitted signal and the response signal. The controller 226 then compares the phase difference to predetermined phase differences corresponding to different types of materials. For example, a metal pipe may be expected to cause a phase difference of approximately 25 degrees, while flesh (e.g., a part of a living being) may be expected to cause a phase difference of 120 degrees. By comparing the calculated phase difference to these predetermined phase differences, the controller 226 is configured to determine the material that reflected the response signal. The predetermined phase differences and associated material types may be stored in a lookup table in the memory 232.

In yet another embodiment, the controller 226 analyzes the dispersion pattern of the transmitted RF signal. Because different materials reflect the RF signal differently, by analyzing the dispersion pattern of the transmitted RF signal, the controller 226 can determine the material of the object in the operating path of the power tool 100. In such embodiments, the RF sensor may also include an RF sensor array to detect the dispersion pattern of the response signal(s). Similar to identifying materials based on phase angle, predetermined dispersion patterns and associated materials may be stored in a lookup table in the memory 232 and accessed by the controller 226 to identify the type of material based on the dispersion pattern detected.

When the object detection sensor 218c includes the capacitive sensor, the controller 226 detects the changes in capacitance and compares the capacitance measurements to, for example, threshold(s) or ranges that correspond to different materials (e.g., which may be stored in a lookup table in the memory 232). For example, a capacitance of less than 100 pF may be indicative of flesh in the operating path of the power tool 100. In such embodiments, when the controller 226 determines that the capacitance detected by the capacitive sensor (or sensors) is less than 100 pF, the controller 226 determines that flesh is in the operating path of the power tool 100 and, in response, interrupts power to the motor 115. The controller 226 may access, for example, a look up table to determine the material of the object in the operating path of the power tool 100. For example, the controller 226 may determine that a capacitance between 150 pF and 200 pF indicates that a metal object (for example, a metal pipe) may be in the operating path of the power tool 100. As discussed below, the controller 226 adjusts or interrupts power to the motor 115 based on the material of the object determined to be present in the operating path of the power tool 100.

When the object detection sensor 218c includes the ultrasound sensor, the controller 226 may analyze similar characteristics or parameters as those analyzed with respect to the RF sensor. For example, the controller 226 receives parameters for the transmitted ultrasound signal and the response ultrasound signal. The controller 226 analyzes, for example, the phase angle between the two ultrasound signals, the frequencies of the two ultrasound signals, the dispersion patterns of the ultrasound signals, or a combination thereof. As discussed above, the controller 226 may access a table that indicates how the different materials of the reflecting object in the operating path of the power tool 100 affect the response signal. Based on these comparisons, the controller 226 may determine the material of the object in the operating path of the power tool 100.

When the object detection sensor 218c includes a camera or camera array, the controller 226 receives visual information (e.g., image data) regarding the operating path of the power tool 100. The controller 226 may then analyze the visual information to extract light patterns associated with a particular object in the operating path of the power tool 100. For example, when the power tool 100 is operating on drywall, the camera may detect a first set of light patterns, but when the power tool 100 is operating on, for example, a metal pipe the light patterns may be different. In some embodiments, the power tool 100 also includes a light that illuminates the operating path of the power tool 100. The light may cause the light patterns detected by the camera (or camera array). In other embodiments, the controller 226 may implement object detection (e.g., for example, using auto-encoders) to analyze the visual information detected by the camera (or camera arrays) and determine whether an extraneous object is present in the operating path of the power tool 100. In embodiments in which more than one camera is used and depth information is gathered, the controller 226 may also determine an estimated distance of an object with respect to the output component of the power tool 100.

When the object detection sensor 218c includes a conductivity probe, the controller 226 receives the conductivity measurement from the conductivity probe (or probes) and compares the conductivity measurement to predetermined conductivities corresponding to different materials. In some embodiments, the predetermined conductivities are not the conductivities of the different materials but, rather, correspond to the conductivity of, for example, the air when an object of a particular material is present. That is, instead of comparing the conductivity measurement to the conductivity of copper, the controller 226 accessed a stored table that indicates that when a copper object is present in air, the conductivity of air, for example, increases. Accordingly, by comparing the conductivity measurements to predetermined conductivity measurements for various materials, the controller 226 can estimate which material corresponds to the object in the operating path of the power tool 100.

Based on which material the controller 226 determines is present in the operating path of the power tool 100, the controller 226 changes the operation of the motor 115. For example, when the controller 226 determines that drywall is present in the operating path of the power tool 100, the controller 226 maintains the operation of the motor 115. However, when the controller 226 determines that flesh (e.g., a part of a living being) is present in the operating path of the power tool 100, the controller 226 interrupts power to the motor 115 to inhibit the power tool 100 from harming the detected flesh. In some embodiments, the controller 226 receives a user input indicating the materials that cause changes to the operation of the motor 115 and indicating the particular changes to occur. For example, the user input may indicate that when flesh is detected in the operating path of the power tool 100, power to the motor 115 is to be stopped, but, when a metal pipe is detected in the operating path of the power tool 100, power to the motor 115 is to be increased. In some embodiments, the user input indicates which materials are to cause the power to the motor 115 to be interrupted, and which materials are to cause the operation of the motor 115 to remain unchanged.

The user input may be received by the controller 226, for example, via an actuator or user interface 222 on the power tool 100 directly. For example, the user interface 222 on the power tool 100 may include one or more of a rotating knob, a dial, an actuator, a sliding actuator, a touch screen, or pushbutton that selects a material (or materials) for which the power to the motor 115 is the interrupted. In other embodiments, the controller 226 receives the user input via the wireless communication controller 228 of the power tool 100. In such embodiments, the wireless communication controller 228 is coupled to the controller 226 and is configured to communicate with an external device 223, which may incorporate the user interface 222, the external device 223 being, for example, a smartphone, a tablet computer, a laptop, and the like. The wireless communication controller 228 may communicate, for example, via Bluetooth Wi-Fi, or other similar wireless communication protocol. In such embodiments, the external device 223 includes the user interface 222 or another user interface that receives the user inputs. For example, the user input may indicate the materials that are to cause a change in operation of the motor 115, the particular change or changes in operation, or both, and relays the indications to the controller 226 via the wireless communication controller 228. The controller 226 receives other types of user input via the user interface 222 on the tool 100 or on the external device and the wireless communication controller 228.

In some embodiments, the controller 226 also receives a user input, via one of the aforementioned techniques, indicating the desired sensitivity for the object detection sensor 218c. Based on the received user input, the controller 226 may adapt, for example, the voltage or other drive signals provided to the object detection sensor 218c or may adapt the thresholds to which the output signals from the object detection sensor 218c are compared to determine which material is in the operating path of the power tool 100. In one example, the controller 226 receives a user input via the user interface 222 indicating to increase the sensitivity of the object detection sensor 218c. The controller 226 then increases the voltage signal applied to the single capacitive probe, which allows the capacitive sensor to detect objects that are farther away.

In some embodiments, the controller 226 may also receive a user input indicating whether the object detection feature is to be enabled or disabled. That is, the controller 226 receives a user input that indicates whether the output signals from the object detection sensor 218c are to be analyzed and whether the operation of the motor 115 is to change based on the output signals from the object detection sensor 218c. The controller 226 may receive the user input via the user interface 222 discussed above.

In some embodiments, the controller 226 defaults to operating the power tool 100 with the object detection feature enabled. In such embodiments, the controller 226 operates the motor 115 according to the trigger 145, determines whether a particular type of object (for example, flesh) is in the operating path of the power tool 100. The controller 226 may then receive a toggle signal (e.g., from a push button or other toggle switch on the user interface 222 on the power tool 100 or from the external device 223 via the wireless communication controller 228) to change the state of the object detection feature. The controller 226 then disables the object detection feature in response to receiving the toggle signal. The controller 226 continues to operate the motor 115 based on the trigger 145 and without regard for outputs from the object detection sensor 218c.

In other embodiments, the controller 226 defaults to operating the power tool 100 with the object detection feature disabled. In such embodiments, the controller 226 operates the motor 115 according to the trigger 145. The controller 226 then receives a toggle signal (e.g., from a push button or other toggle switch on the user interface 222 on the power tool 100 or on the external device 223 via the wireless communication controller 228) to change the state of the object detection feature. In response to receiving the toggle signal, the controller 226 enables the object detection feature. When the controller 226 determines that an extraneous object is in the operating path of the power tool 100, the controller 226 changes the operation of the motor 115.

Figure 3:
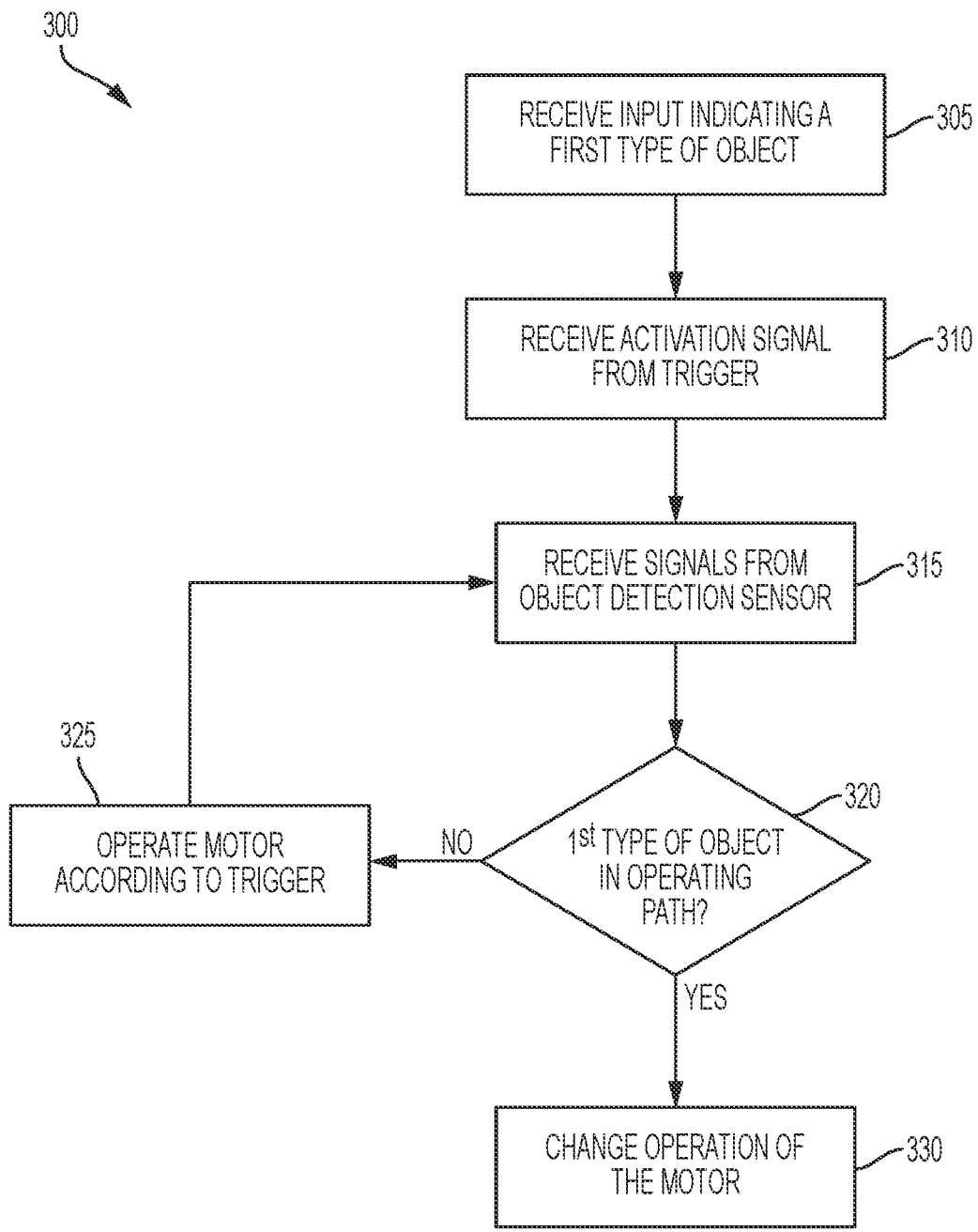
FIG. 3 is a flowchart illustrating a first method of operating the power tool.

FIG. 3 illustrates a first method 300 of implementing the object detection feature by the controller 226. In the first method 300, the controller 226 defaults the power tool 100 to operate the motor 115 according to the trigger 145, and changing the operation of the motor 115 when a first type of object is detected in the operating path of the power tool 100. The controller 226 is configured to detect different types of materials (e.g., dry wall, plaster, concrete, empty piping, metal, wood, water or liquid (e.g., within a pipe or other conduit), powered conductors (e.g., wires)), flesh, or a combination thereof. In some embodiments, changing the operation of the motor 115 includes interrupting power to the motor 115. In some embodiments, rather than interrupt power to the motor 115 in response to detecting a particular type of object (e.g., metal, wood, hard wood, etc.), the controller 226 controls the motor 115 in a different manner, such as by increasing the speed of or power to the motor 115.

In step 305, the controller 226 receives an input indicating the first type of object for which the operation of the motor 115 is to change (step 305). For example, the controller 226 may receive the indication from the user interface 222 (e.g., a knob, sliding selector, or push button) on the power tool 100, or the user interface 222 on an external device 223 (e.g., a smartphone or tablet) via a wired or wireless connection with the wireless controller 228. In some embodiments, the indication is input at the time of manufacturing and is hard-coded into the controller 226, rather than being input by an end-user. The controller 226 then receives an activation signal from the trigger switch 213, for example, when the trigger 145 is activated by the user (step 310). The controller 226 also receives signals from the object detection sensor 218c (step 315). In response to receiving the activation signal, the controller 226 determines, based on the output signals from the object detection sensor 218c, whether the first type of object is in the operating path (step 320). Examples of object detection sensors 218c and techniques for object type determination are explained in further detail above. While the controller 226 determines that the first type of object is absent from the operating path, the controller 226 drives the motor 115 according to the trigger 145 (step 325). The controller 226 loops back to step 315 to receive updated signals from the object detection sensor 218c, and determine whether the first type of object is present in step 320. When, in step 320, the controller 226 determines that the first type of object is present in the operating path, the controller 226 changes the operation of the motor 115 (step 330). For example, when the controller 226 determines that flesh is in the operating path, the controller 226 inhibits power to the motor 115. In some embodiments, to reset the operation of the power tool 100 after the controller 226 changes the operation of the motor 115, the power tool 100 is restarted by, for example, reconnecting the power source (e.g., the battery pack). In other embodiments, the operation of the power tool 100 may be reset by, for example, releasing the trigger 145 and re-engaging the trigger 145.

Figure 4:
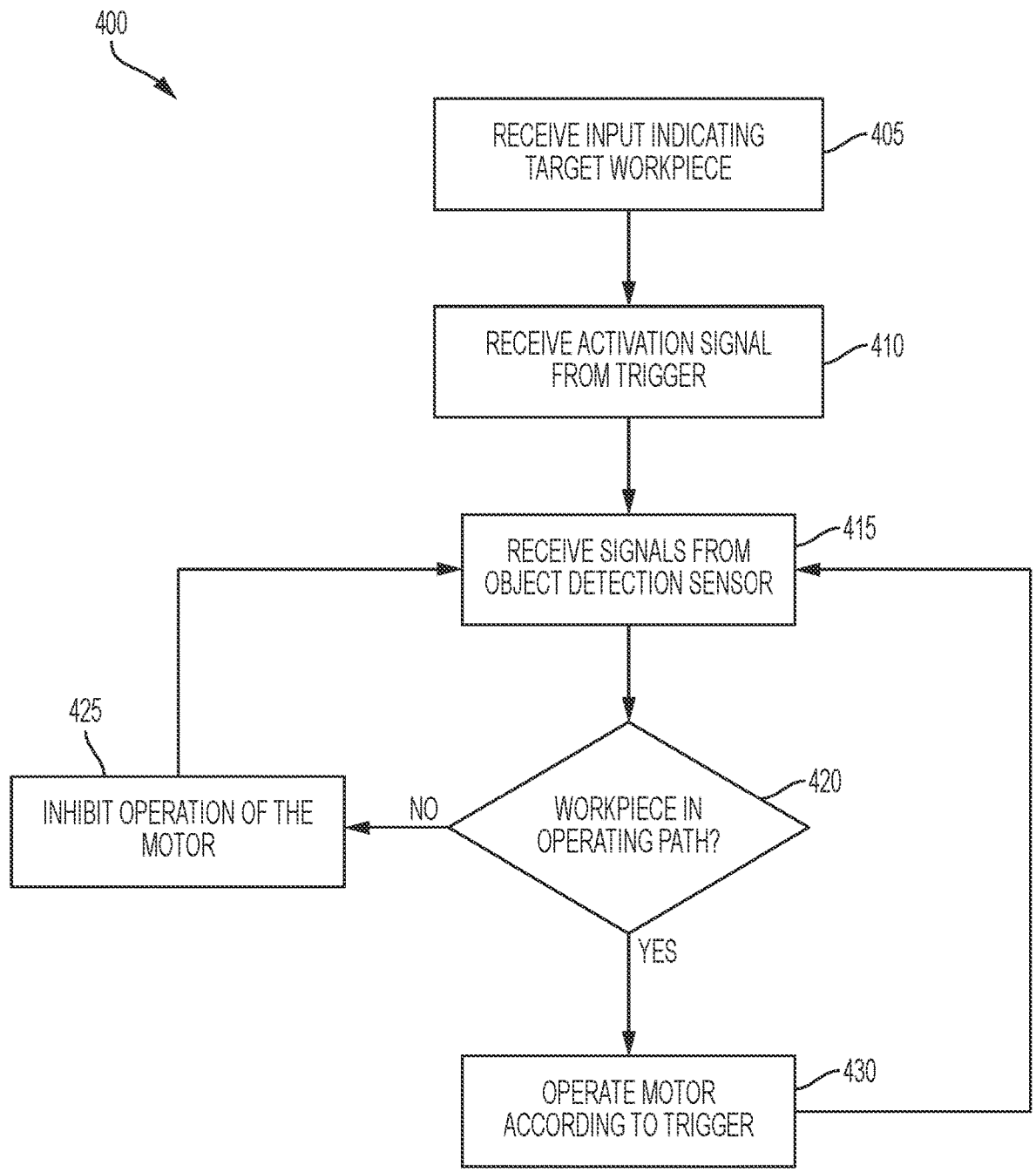
FIG. 4 is a flowchart illustrating a second method of operating the power tool.

FIG. 4 illustrates a second method 400 of implementing the object detection feature by the controller 226. In the second method 400, the controller 226 defaults the power tool 100 to inhibit operation of the motor 115 until a workpiece is detected by the controller 226. As discussed above, with respect to FIG. 3, the controller 226 is configured to detect different types of materials (e.g., dry wall, plaster, concrete, empty piping, metal, wood, water or liquid (e.g., within a pipe or other conduit), powered conductors (e.g., wires)), flesh, or a combination thereof. In step 405, the controller 226 receives an input via the user interface 222 indicating the material of the target workpiece (step 405). For example, the user may indicate that the desired workpiece is slab of wood, a piece of dry wall, a portion of pipe, and the like using above-noted user input techniques. In some embodiments, the indication of the desired workpiece is input at the time of manufacturing and is hard-coded into the controller 226, rather than being input by an end-user. The controller 226 then receives the activation signal from the trigger switch 213 indicating, for example, that the trigger 145 is activated by the user (step 410). The controller 226 also receives signals from the object detection sensor 218c (step 415). In response to receiving the activation signal, the controller 226 determines, based on the output signals from the object detection sensor 218c, whether the workpiece of the type specified in step 405 is present in the operating path (step 420). While the controller 226 is not able to confirm that the workpiece is present in the operating path, the controller 226 inhibits operation of the motor 115 (step 425), and returns to step 415 to receive and then, in step 420, continue to analyze the signals from the object detection sensor 218c to check for the presence of the workpiece in the operating path. When the controller 226 confirms that the workpiece is present in the operating path, the controller 226 activates the motor 115 according to the trigger 145 (step 430). In some embodiments, the controller 226 then returns to step 415 to receive, and then analyze (in step 420) signals from the object detection sensor 218c. In some embodiments, the controller 226 determines whether only the workpiece is present in the operating path before activating the motor 115. In such embodiments, the controller 226 not only confirms the presence of the workpiece, but also confirms the absence of other types of objects based on the signals from the object detection sensor 218c before activating the motor 115.

Thus, embodiments described herein provide, among other things, a power tool including an object detection feature that enables the operation of the power tool to change based on the materials that are present in the operating path of the power tool.

What is claimed is:
1. A power tool comprising:
a housing;
a motor within the housing;
an output component coupled to the motor, the output component defining an operating path of the power tool;
an object detection sensor configured to generate an output signal indicative of an object being proximate to or in the operating path of the power tool; and
a controller connected to the motor and the object detection sensor, the controller including an electronic processor and a memory storing instructions that, when executed by the electronic processor, cause the electronic processor to:
receive the output signal from the object detection sensor,
determine, based on the output signal received from the object detection sensor, a type of material of an object proximate to or in the operating path of the power tool,
maintain, based on the determined type of material of the object proximate to or in the operating path of the power tool being a first type of material, an amount of electrical current available to the motor,
inhibit, based on the determined type of material of the object proximate to or in the operating path of the power tool being a second type of material, the amount of electrical current available to the motor, wherein the first type of material is different from the second type of material, and
increase, based on the determined type of material of the object proximate to or in the operating path of the power tool being a third type of material, the level of electrical current to the motor, wherein the third type of material is different from both the first type of material and he second type of material.
2. The power tool of claim 1, wherein:
the second type of material is flesh, and
to inhibit the amount of electrical current to the motor, the instructions are further configured to cause the electronic processor to interrupt electrical current to the motor.
3. The power tool of claim 1, wherein the second type of material includes at least one material selected from the group consisting of flesh, a part of a living being, and a liquid.
4. The power tool of claim 1, wherein, to determine the type of material of the object proximate to or in the operating path of the power tool, the electronic processor is configured to:
analyze sensor information including at least one selected from the group consisting of a phase angle of the output signal, a frequency of the output signal, a dispersion pattern of the output signal, or a combination thereof; and
determine, based on the analyzed sensor information, the type of material of the object proximate to or in the operating path of the power tool.
5. The power tool of claim 1, wherein:
the memory further stores a lookup table, to determine the type of material of the object proximate to or in the operating path of the power tool, the instructions are further configured to cause the electronic processor to:
  compare the output signal to thresholds or ranges stored in the lookup table in association with different types of materials, and
  determine, from among the different types of materials in the lookup table, the type of material of the object proximate to or in the operating path of the power tool,
wherein a first output signal received from the object detection sensor indicates that the first type of material is proximate to or in the operating path of the power tool, and
wherein a second output signal received from the object detection sensor indicates the second type of material is proximate to or in the operating path of the power tool.

6. The power tool of claim 5, wherein the thresholds or ranges stored in the lookup table include at least one selected from the group consisting of frequencies, phase differences, phase angles, capacitance measurements, conductivity measurements, and dispersion patterns.

7. The power tool of claim 5, wherein:
the object detection sensor includes a radio frequency (RF) or ultrasound sensor that transmits a wideband frequency signal, and
the thresholds or ranges stored in the lookup table include frequencies, phase differences or dispersion patterns of RF or ultrasound sensor response signals.

8. The power tool of claim 5, wherein:
the object detection sensor includes a capacitive sensor, and
the thresholds or ranges stored in the lookup table include capacitance measurements.

9. The power tool of claim 5, wherein:
the object detection sensor includes a conductivity probe, and
the thresholds or ranges stored in the lookup table include conductivity measurements.

10. The power tool of claim 5, wherein:
the object detection sensor includes a camera or camera array, and
to determine the type of material of the object proximate to or in the operating path of the power tool, the instructions are further configured to cause the electronic processor to:
  receive image data in the output signal,
  analyze the image data to extract light patterns associated with a particular object, and
  determine the type of material of the object proximate to or in the operating path of the power tool based on the analysis of the extracted light patterns.

11. The power tool of claim 1, wherein the instructions are further configured to cause the electronic processor to:
receive a user input that selects which type of materials detected by the object detection sensor cause what type of changes in the operation of the motor, and
update the lookup table in the memory based on the received user input.

12. A power tool comprising:
a housing;
a motor within the housing;
an output component coupled to the motor, the output component defining an operating path of the power tool;
an object detection sensor configured to generate an output signal indicative of an object being proximate to or in the operating path of the power tool; and
a controller connected to the motor and the object detection sensor, the controller including an electronic processor and a memory storing instructions that when executed by the electronic processor cause the electronic processor to:
  detect a change in the output signal;
  determine whether one of a first extraneous object, a second extraneous object, or a third extraneous object is proximate to or in the operating path of the power tool based on the change in the output signal; and
  change an amount of electrical current available to the motor in response to determining which of the first extraneous object, the second extraneous object, or the third extraneous object is proximate to or in the operating path of the power tool,
wherein the first extraneous object is different from both the second extraneous object and the third extraneous object, and the second extraneous object is different from the third extraneous object.

13. The power tool of claim 12, wherein, to detect the change in the output signal, the electronic processor is configured to:
analyze information including at least one selected from the group consisting of phase angles between two output signals, frequencies of the two output signals, dispersion patterns of the two output signals, or a combination thereof; and
based on detecting a change in the analyzed information, detect the change in the output signal.

14. The power tool of claim 12, wherein, to change the amount of electrical current available to the motor, the electronic processor is configured to interrupt the electrical current to the motor.

15. The power tool of claim 12, wherein the object detection sensor includes at least one selected from the group consisting of a radio frequency (RF) sensor, a capacitive sensor, a camera, a conductivity probe, and an ultrasound probe.

16. The power tool of claim 12, further comprising a trigger, wherein the amount of electrical current is only supplied to the motor when the trigger is depressed.

17. A power tool controller comprising:
an electronic processor; and
a memory storing instructions that when executed by the electronic processor cause the electronic processor to:
  receive an output signal from an object detection sensor,
  determine, based on the output signal received from the object detection sensor, a type of material of an object proximate to or in the operating path of a power tool,
  maintain, based on the determined type of material of the object proximate to or in the operating path of the power tool being a first type of material, an amount of electrical current available to a motor of the power tool,
  inhibit, based on the determined type of material of the object proximate to or in the operating path of the power tool being a second type of material, the amount of electrical current available to the motor of the power tool, wherein the first type of material is different from the second type of material, and increase, based on the determined type of material of the object proximate to or in the operating path of the power tool being a third type of material, the level of electrical current to the motor, wherein the third type of material is different from both the first type of material and the second type of material.

18. The power tool controller of claim 17, wherein:

the second type of material is flesh, and to inhibit the amount of current to the motor, the instructions are further configured to cause the electronic processor to interrupt the amount of electrical current to the motor.

19. The power tool controller of claim 17, wherein the memory further stores a lookup table, to determine the type of material of the object proximate to or in the operating path of the power tool, the instructions are further configured to cause the electronic processor to:

compare the output signal to thresholds or ranges stored in the lookup table in association with different types of materials, and determine, from among the different types of materials in the lookup table, the type of material of the object proximate to or in the operating path of the power tool, wherein a first output signal received from the object detection sensor indicates that the first type of material is proximate to or in the operating path of the power tool, and wherein a second output signal received from the object detection sensor indicates the second type of material is proximate to or in the operating path of the power tool.

* * * * *